United States Patent [19]

Kühne Manfred et al.

[11] Patent Number: 4,762,138
[45] Date of Patent: Aug. 9, 1988

[54] DEVICE FOR MONITORING THE END DROPOUT OF CIGARETTES

[75] Inventors: Kühne Manfred, Furtwangen; Theodor Gast, Berlin; Karl-Ulrich Kramm, Rheinstetten; Karl Nolte, Berlin, all of Fed. Rep. of Germany

[73] Assignee: B.A.T. Cigarettenfabriken GmbH, Hamburg, Fed. Rep. of Germany

[21] Appl. No.: 941,113

[22] Filed: Dec. 12, 1986

[30] Foreign Application Priority Data

Dec. 13, 1985 [DE] Fed. Rep. of Germany ....... 3544152

[51] Int. Cl.⁴ .......................... A24C 5/00; A24C 5/60
[52] U.S. Cl. ................................. 131/280; 131/908; 131/910
[58] Field of Search .................. 131/908, 910, 280

[56] References Cited

U.S. PATENT DOCUMENTS 3,703,235 11/1972 McEnery .

FOREIGN PATENT DOCUMENTS 1257651 12/1967 Fed. Rep. of Germany .
2060887  6/1971 Fed. Rep. of Germany .
2236218  3/1973 Fed. Rep. of Germany .
2813866 10/1974 Fed. Rep. of Germany .
3146507  6/1983 Fed. Rep. of Germany .
2343668  7/1988 Fed. Rep. of Germany .
1347221  2/1974 United Kingdom .

OTHER PUBLICATIONS

Borgwaldt, Ends Tester E 44 (2 Pages).

Primary Examiner—V. Millin
Attorney, Agent, or Firm—Armstrong, Nikaido, Marmelstein & Kubovcik

[57] ABSTRACT

For monitoring the end dropout of cigarettes in the course of the cigarette production beneath a point at which the cigarettes rotate about their longitudinal axis a mass transducer for the dropping tobacco particles is disposed; an evaluating device determines from the mass of the tobacco particles on the one hand and the number of cigarettes passing through on the other the average end dropout. The mass transducer includes a vertically movably resiliently mounted pushrod which is held in its desired position by an electromagnetic return system. The magnitude of the current supplied to an electromagnetic return system represents a measure of the mass of the collected tobacco particles.

7 Claims, 4 Drawing Sheets

DEVICE FOR MONITORING THE END DROPOUT OF CIGARETTES

BACKGROUND OF THE INVENTION

1. Field of the Invention

The invention relates to a device for monitoring the end dropout of cigarettes.

2. Description of the Prior Art

Cigarettes with ends inadequately filled with tobacco should be automatically detected in cigarette production and separated out because when the cigarettes are removed from a pack tobacco particles drop out of the ends, the so-called "end dropout", and this quality defect is immediately noticed by the smoker. In particular, the manufacturing should be carried out in such a manner that the ends of the finished cigarettes are adequately and permanently filled with tobacco.

Test methods are already known in which mechanical test pins are pressed against the individual cigarette ends and from the magnitude of the penetration depth it can be concluded whether the filling of the cigarette ends is adequate (cf. for example DE-AS No. 1,257,651). The resulting mechanical influence of the cigarette ends by the measurement is however undesirable.

DE-PS No. 2,343,668 further discloses a capacitive measuring arrangement having at least two electrodes connected to a high-frequency voltage source; the position of the electrodes with respect to the cigarette ends is chosen so that at the measuring instant a high-frequency field emanating therefrom traverses the individual cigarette ends.

It is further known to detect incompletely filled cigarette ends by the intensity of a light beam reflected by the end of the cigarette, cf. DE-OS No. 2,813,866, DE-OS No. 2,236,218 and DE-OS No. 3,146,507. A combination of optical/mechanical measuring means is disclosed in DE-OS No. 2,060,887, according to which the cigarette ends are compressed laterally by means of compressed air, the extent of the compression being monitored by means of a light beam.

The aforementioned test methods carried out in the course of continuous cigarette production all have the disadvantage that they only provide information on the filling state of the respective cigarette end at a certain point of time but no information on the loss of tobacco mass due to a defined mechanical stressing of the cigarettes.

A device which does permit this, although only batchwise in laboratory operation, is known to the expert in the form of the "end test device" of the company Heinrich Borgwaldt, Hamburg. A specific number of cigarettes, for example simultaneously 50 cigarettes, are subjected in an oval container whose walls consist of round rods to a rolling and dropping movement. During a predetermined period of time or number of revolutions the tobacco particles dropping out of the cigarette ends are collected.

After a predetermined period of time, for example after three minutes, the collected tobacco particles are weighed so that the average end dropout for a predetermined number of cigarettes can be determined.

The advantage of this laboratory method is its relatively high accuracy of information; a disadvantage however is that it can only be used for random samples, i.e. the continuous monitoring of all cigarettes made in cigarette production is not possible.

SUMMARY OF THE INVENTION

The invention therefore has as its object the provision of a device for monitoring the average end dropout of cigarettes of the type described which can be associated with the cigarette making apparatus directly without interfering with the flow of finished cigarettes.

The measurement result is to correlate as well as possible with the results of the end test device of the Borgwaldt company which has largely established itself in the laboratories of the cigarette industry.

The invention therefore proposes in a device for monitoring the average end dropout of cigarettes comprising a means for rolling a defined number of cigarettes along a support and a means for detecting the total mass of the tobacco particles dropping out of the cigarettes during a predetermined period of time in the rolling movement, the improvement that in the path of the cigarette manufacturing apparatus beneath a conveying path along which the finished cigarettes during their transaxial conveying movement rotate about their longitudinal axis a mass receiver for the dropping tobacco particles is disposed and that an evaluating means determines the average end dropout from the amount of tobacco particles determined by the mass receiver on the one hand and the number of cigarettes which have passed through the conveying path on the other.

Advantageous embodiments are defined by the features of the subsidiary claims.

The advantages achieved with the invention are due to the following mode of operation: In the path of the cigarette manufacturing apparatus beneath a suitable conveying path on passage through which the cigarettes rotate about their longitudinal axis, a mass receiver or pickup for the tobacco particles falling out of the ends of the cigarettes is disposed. The conveying path between the filter attachment machine and a following inspection path has been found particularly suitable; for the mass of the end dropout collecting there, based on 20,000 cigarettes, has substantially the same order of magnitude as the mass collecting in the laboratory test device for 200 cigarettes. The attachment of the necessary funnel-like collecting means for the end dropout is possible at this point without any major modifications to the existing construction of the cigarette manufacturing apparatus being necessary. And finally, beneath this conveying path there is enough room for installation of the mass receiver.

The mass receiver or pickup is connected to an evaluating means which from the mass of the collected tobacco particles on the one hand and the number of cigarettes leaving the filter attachment machine on the other, governed by the production speed of the machine, determines the average end dropout with respect to a defined number of cigarettes.

Comparative tests have shown that a very good correlation is obtained with the results of the end test device hitherto used in the laboratory for testing only random samples.

The evaluating means including the associated display device can be integrated into the filter attachment machine or mounted on the latter.

By appropriate calibration of the evaluating means the displayed measured value can be calibrated to correspond to the hitherto usual end test devices.

The mass pickups or transducers available commercially are not suitable for detecting the mass of the tobacco particles falling out in particular because of their extreme sensitivity to horizontally acting vibrations and forces which necessarily occur adjacent cigarette making machines.

For this reason a special construction is used in which the collecting pan for the dropping tobacco particles is carried by a vertical pushrod which is held by two cross-spring guides and thereby is substantially insensitive to horizontally acting vibrations and forces.

A differential light barrier detects the position changes of the pushrod in the vertical direction; the light barrier differential signal is applied to an electronic control circuit in the evaluating means, the output signal of which, in correspondence with the position change of the pushrod, effects a change in the coil current and thus a magnetic field change of an electromagnetic return means for the pushrod.

The electromagnetic return means consists essentially of a coil body disposed at the lower end of the pushrod with a coil dipping into a ring core magnetic system.

When tobacco particles drop out of the end of the cigarette onto the collecting tray of the mass transducer or pickup the pushrod is displaced vertically downwardly. The resulting position change of the pushrod is detected by the differential light barrier so that a corresponding actual signal is supplied to the control circuit of the electromagentic return means. The output signal of the control circuit acts on an electronic circuit which in turn increases the current in the coil at the end of the pushrod; the resulting increase in the magnetic field strength causes the pushrod to be pushed back upwardly into its original position. The current necessary for this purpose is measured in the coil and is proportional to the downward force which the falling tobacco particles exert on the collecting tray or pan. Said mass transducer is not only relatively insensitive to horizontal forces and vibrations but also to vertical shocks and vibrations because electronic compensation possibilities exist for them in particular a signal damping in the control circuit; moreover, the digital filter techniques can also be used for suppressing fluctuations of the measurement signals possibly caused by vertical shocks and vibrations.

Since the spatial separation of mass transducer and evaluating means involves no problems the evaluating means, which requires a relatively large amount of space, can be set up where it does not obstruct production.

Due to the direct association of this test device to the cigarette producing apparatus all cigarettes made in production can be monitored, i.e. any systematic errors in the production such as a change of the tobacco quality or machine specifications, can be immediately detected and counter-measures initiated straightaway.

BRIEF DESCRIPTION OF THE DRAWINGS

The invention will be described in more detail hereinafter with the aid of an example of embodiment with reference to the accompanying diagramatic drawings, wherein.

DESCRIPTION OF THE PREFERRED EMBODIMENT

Figure 1:
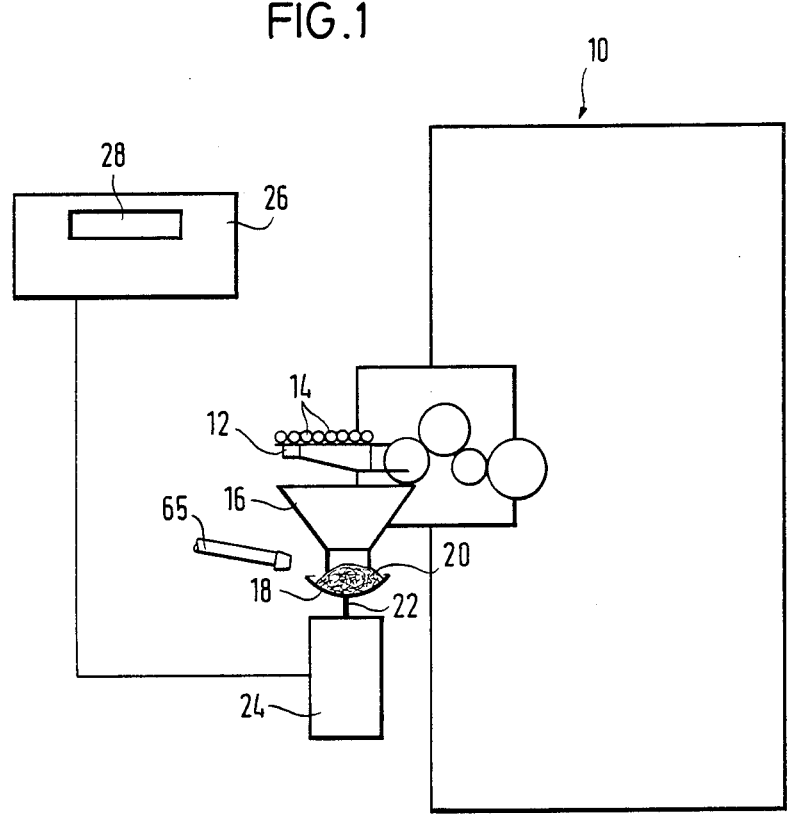
FIG. 1 shows the arrangement of a monitoring device for the end dropout of cigarettes on a filter attachment machine.

FIG. 1 shows a schematic illustration of a commercially usual filter attachment machine 10. The important point is only that this filter attachment machine 10 is followed by a conveyor or transfer section 12 formed by a conveying belt and leading to an inspection path. The cigarettes roll along this transfer path 12, i.e. they rotate about their longitudinal axis. The individual cigarettes are so disposed that their ends project somewhat beyond the support face of the transfer path 12 so that tobacco particles detaching themselves from the ends of the cigarette 14 can drop freely through a funnel 16 onto a collecting pan 18. The tobacco particles which have collected on the collecting pan 18 are indicated in FIG. 1 by the reference numeral 20.

The collecting pan 18 is carried by a vertical pushrod 22, i.e. it is mounted on the upper end of the pushrod 22, which forms part of a mass transducer or pickup 24.

The mass transducer 24 is connected to an evaluating means 26 which from the measured value obtained, possibly after calibration and adaptation to specific operating conditions, generates a measurement signal and represents it on a display device 28.

Figure 2:
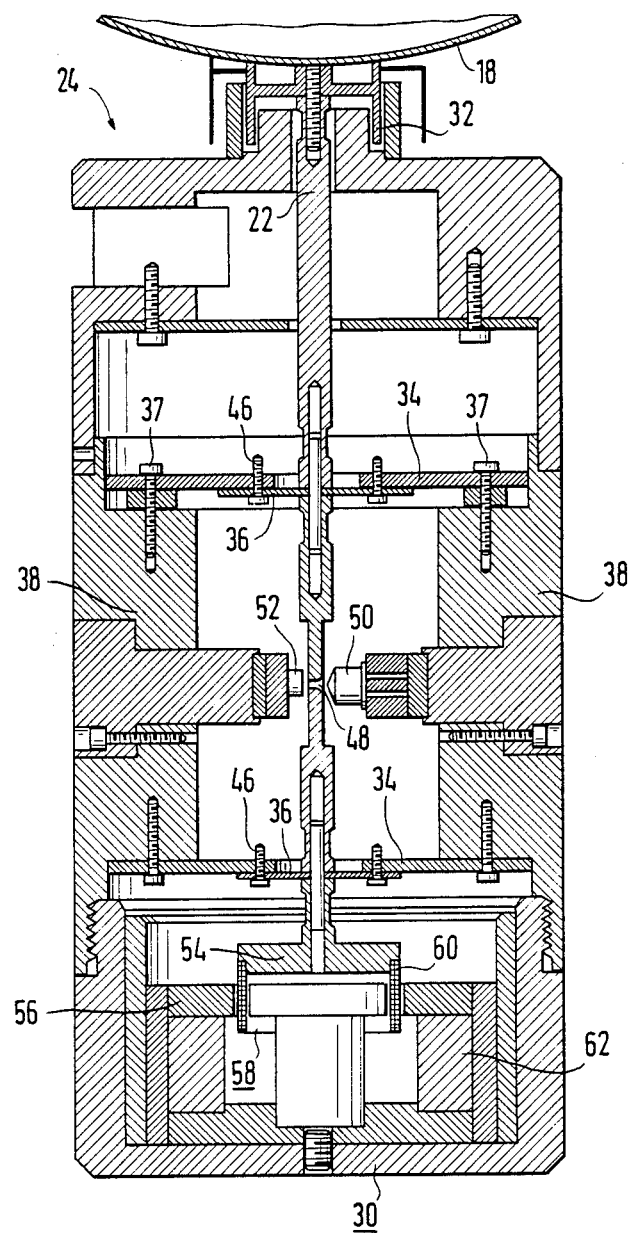
FIG. 2 shows a vertical section through the mass transducer of said monitoring device.

The structure of the mass transducer 24 is apparent from FIG. 2. It comprises a housing 30 which is made up of several individual components and in which the pushrod 22 is displaceable in the vertical direction.

As apparent from FIG. 2 the collecting pan 18 is connected to the upper end of the pushrod 22 and also comprises an annular downwardly projecting pan support 32 which is guided freely movably in an annular gap at the upper end of the housing 30; if the tobacco mass 20 lying on the collecting pan 18 becomes too great the pan support 32 comes into engagement with the bottom of the annular gap and as a result damage to the sensitive pushrod 22 or the electromagnetic components still to be described is avoided.

The pushrod 22 is mounted by two horizontally disposed leaf spring arrangements each comprising a spring holding plate 34 and a likewise plate-shaped cross-spring guide 36.

Figure 3:
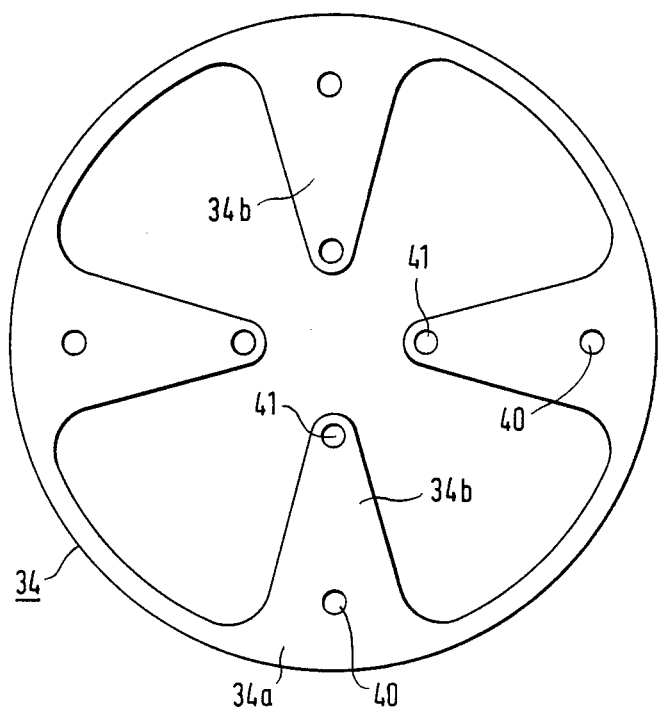
FIG. 3 is a plan view of one of the two spring holding plates.

Each spring holding plate 34 has the form of a ring 34a with four inwardly projecting somewhat conically tapering tabs 34b. The spring holding plates 34 are secured by screws 37 to associated shoulders 38 of the housing 30. As apparent in particular from FIG. 3 the associated screw holes 40 in the spring holding plates 34 are located in the radially outer regions of the tabs 34b, that is almost in the circular ring 34a. Further screw holes 41 are located in the radially inner ends of the tabs 34b.

As the name itself indicates the two cross-spring guides 36 have a substantially cross form and comprise circular projections 42 which are arranged symmetrically at the same angles as the tabs 34b and have screw holes 44 which correspond to the positions of the screw holes 41 in the spring holding plates 34. Screws 46 extend through the screw holes 41 and 44 and thus connect the cross-spring guide 36 and spring holding plate 34 together.

Figure 4:
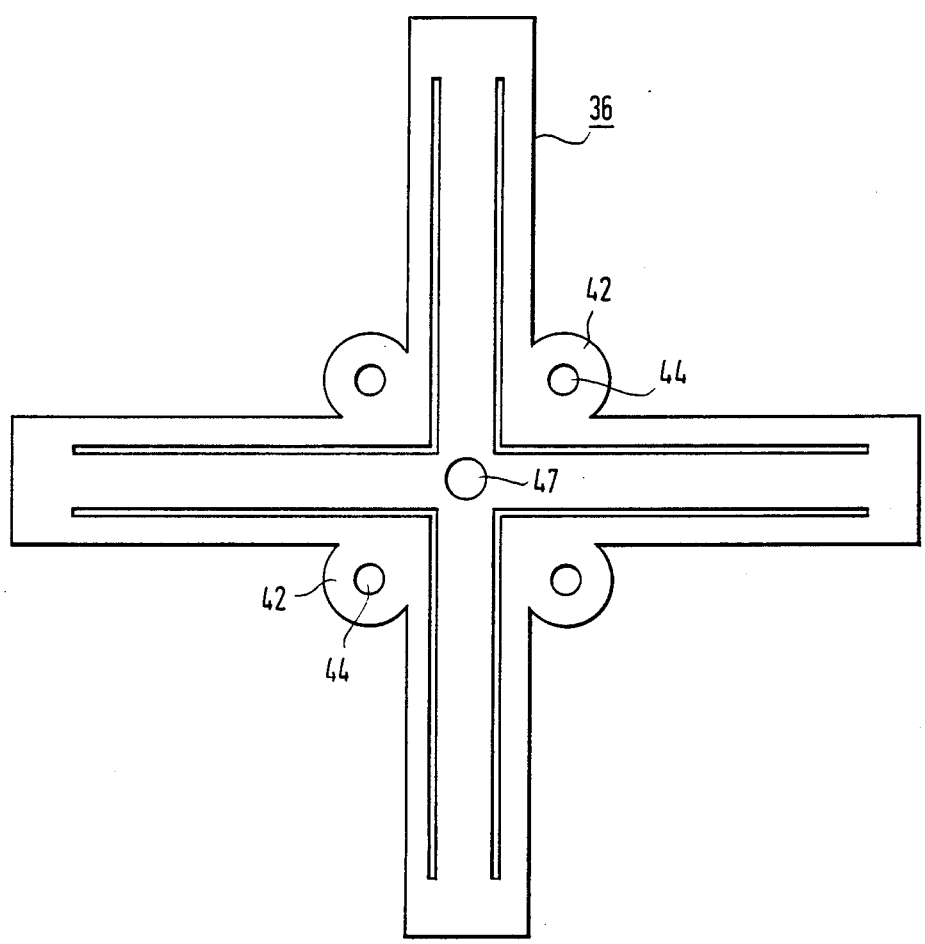
FIG. 4 is a plan view of one of the two cross-spring guides.

The circular projections 42 of the cross-spring guides 36 carry as apparent in FIG. 4 an "outer cross" which is connected to an inner cross only via the ends of the four legs of the outer cross, i.e. the inner cross can move relatively freely with respect to the outer cross. The gap between these two crosses is also apparent in FIG. 4.

In the centre of the inner cross there is a circular opening 47 for receiving the pushrod 22, the edges of said opening 47 being received in an annular gap of the pushrod 22.

Substantially in the centre between the two cross-spring guides 36 serving as mount for the pushrod 22 the latter (22) comprises a horizontally extending through-opening 48. In accordance with the illustration of FIG. 2 on the right side of said opening there is a light-emitting element 50, in particular a light-emitting diode LED, whilst on the left side of the opening 48 a photosensitive element 52, in particular a differential photodiode, is disposed. The differential photodiode 52 consists of two photosensitive surfaces disposed in this case above each other.

At its lower end the pushrod 22 carries a disc-shaped plate 54, from the edge of which a coil body 58 extends downwardly with a wound coil 60 into an annular field-strengthening plate 56.

On vertical displacement of the pushrod 22 downwardly the coil 60 dips into a ring magnet 62.

Hereinafter the mode of operation of the monitoring device will be explained.

During production tobacco particles drop out of the ends of the cigarettes 14 continuously via the funnel 16 onto the collecting pan 18 so that for example at a production speed of 6000 cigarettes per minute within one hour about 20 to 60 g tobacco particles 20 are accumulated.

With the mass pickup or transducer 24 the absolute weight of this tobacco mass 20 and thus also the weight gradient per unit time is determined.

The differential light barrier 50, 52 formed by the LED 50 and two photodiodes 52 detects the position change of the pushrod 22 in the vertical direction caused momentarily by the tobacco mass 20 and emits a corresponding differential signal when the light signal is weakened in one of the photosensitive surfaces, i.e. the pushrod 22 and thus the collecting pan 18 are no longer in the desired position. This differential signal of the light barrier 50, 52 is supplied to an electronic control circuit in the evaluating means 26, the output signal of which effects a change in the current applied to the coil 60 and thus a change in the magnetic field of the electromagnetic return means formed by the annular permanent magnet 62 and the coil 60.

The current in the coil 60 is increased until the pushrod 22 has been brought upwardly into its desired position again by the resulting increase in the magnetic field strength. When the light barrier 50, 52 again detects the desired position the associated coil current is measured; over a wide range it is proportional to the force which acts on the collecting pan 18, i.e. proportional to the mass of the tobacco particles 20.

The analog signal for the coil current and thus for the tobacco weight is digitized via an analog/digital converter and calculated for the cigarette duty; this "cigarette duty" is a clock signal for the number of cigarettes 14 produced during the monitoring period.

In the evaluating means 26 the measured values are processed and corrected by freely selectable presettings. The digital display means 28 displays the measured value, i.e. the average end dropout of the predetermined number of cigarettes.

The evaluating means 26 can either be integrated into the filter attachment machine 10 or set up on the machine.

To permit a comparison with the conventional laboratory measuring method for end dropout the measurement signal of the mass pickup 24 is evaluated in dependence upon the number of cigarettes produced; for example, after 5000 cigarettes produced the measured value is read and then calculated for a selectable number of cigarettes. The tobacco weight is then obtained as measured value in grams, for example per 1000 cigarettes, making it possible to choose the number of cigarettes freely, or on calibration of the measured value the reference measuring method having to be considered. The duration of a single monitoring period depends on the production speed, the amount of tobacco end dropout and the desired measured value resolution accuracy.

The measured value thus calculated and calibrated is digitally displayed on the display device 28; thus, the numerical value is shown which would have been obtained with the hitherto conventional laboratory measuring system. It is also possible via a sliding mean value calculation to obtain a quasicontinuous display of the weight gradient.

In addition, on the display means 28 the limit value for activation of a blowing or suction removing means can be displayed, said means removing the tobacco particles 20 from the collecting pan 18 after expiry of the respective monitoring period.

For this purpose a nozzle 65 can be connected to a compressed air source.

We claim:

1. A device for monitoring the average end dropout of cigarettes in combination with a cigarette manufacturing apparatus, said device comprising
   (a) a means for rolling a defined number of cigarettes along a support, and
   (b) a means for detecting the total mass of the tobacco particles dropping out of the cigarettes during a predetermined period of time in the rolling movement, wherein
   (c) in the path of the cigarette manufacturing apparatus beneath a conveying path along which the finished cigarettes during their transaxial conveying movement rotate about their longitudinal axis a mass transducer for the dropping tobacco particles is disposed, and
   (d) an evaluating means determines the average end dropout from the amount of tobacco particles determined by the mass transducer on the one hand and the number of cigarettes which have passed through the conveying path on the other.

2. A device according to claim 1, wherein the mass transducer is disposed beneath the conveying path leading from a filter attachment machine to an inspection path.

3. A device according to claim 1, wherein the mass transducer comprises a collecting pan which is carried by a vertically movably mounted pushrod and the mass of the tobacco particles falling out is determined from the displacement of the pushrod.

4. A device according to claim 3, wherein the pushrod is mounted vertically movably by two cross-spring guides with associated spring holding plates.

5. A device according to claim 3, wherein a means is provided for determining the vertical position of the pushrod and at the lower end of the pushrod a current-carrying coil is disposed which dips into a magnet, and the pushrod can be brought by a change of the coil current controlled by said determining means into its desired position in which the coil current represents a measure of the mass of the collected tobacco particles.

6. A device according to claim 5, wherein for determining the vertical position of the pushrod the latter comprises a horizontally extending opening and, aligned in each case with the opening, on one side of the pushrod a light-emitting element is disposed and on the opposite side a photosensitive element.

7. A device according to claim 6, wherein the photosensitive element is a differential photodiode.

* * * * *